US011774142B2

(12) United States Patent
Wang et al.

(10) Patent No.: US 11,774,142 B2
(45) Date of Patent: Oct. 3, 2023

(54) DOUBLE-LINE FOCUSING SOLAR ENERGY COLLECTION APPARATUS

(71) Applicant: Changzhou University, Changzhou (CN)

(72) Inventors: Cheng Wang, Changzhou (CN); Ye Zhu, Changzhou (CN)

(73) Assignee: Changzhou University, Changzhou (CN)

( * ) Notice: Subject to any disclaimer, the term of this patent is extended or adjusted under 35 U.S.C. 154(b) by 256 days.

(21) Appl. No.: 16/614,374

(22) PCT Filed: May 18, 2018

(86) PCT No.: PCT/CN2018/087465
§ 371 (c)(1),
(2) Date: Apr. 29, 2021

(87) PCT Pub. No.: WO2018/210330
PCT Pub. Date: Nov. 22, 2018

(65) Prior Publication Data
US 2021/0239364 A1 Aug. 5, 2021

(30) Foreign Application Priority Data

May 18, 2017 (CN) .......................... 201710352005.4
May 18, 2017 (CN) .......................... 201710352302.9

(51) Int. Cl.
F24S 23/74 (2018.01)
F24S 20/20 (2018.01)
(Continued)

(52) U.S. Cl.
CPC .............. *F24S 23/74* (2018.05); *F24S 10/40* (2018.05); *F24S 20/20* (2018.05); *F24S 23/79* (2018.05);
(Continued)

(58) Field of Classification Search
CPC .. F24S 10/20; F24S 10/40; F24S 23/74; F24S 23/79; F24S 50/20; F24S 80/10; F24S 80/54
(Continued)

(56) References Cited

U.S. PATENT DOCUMENTS

| 4,091,796 A | * | 5/1978 | Bieringer ................ F24S 23/74 |
| | | | 126/657 |
| 2013/0092154 A1 | * | 4/2013 | Lu ........................ F24S 30/425 |
| | | | 126/685 |
| 2017/0054408 A1 | * | 2/2017 | Lakshmanan ........... H02S 20/32 |

FOREIGN PATENT DOCUMENTS

CN 102116535 A * 7/2011

* cited by examiner

Primary Examiner — Vivek K Shirsat
(74) Attorney, Agent, or Firm — Idea Intellectual Limited; Margaret A. Burke; Sam T. Yip

(57) ABSTRACT

A double line focusing solar energy collection apparatus of the present invention includes a heat collector, a secondary concentrator, and a bracket. The heat collector includes a primary concentrator and a heat collection tube, in which the primary concentrator has a focus line. The secondary concentrator has a focus line. The bracket supports the primary concentrator, the heat collection tube, and the secondary concentrator. The heat collection tube is located between the primary and secondary concentrators and located on the focus lines of the secondary and primary concentrators. The primary concentrator is a paraboloid reflector or Fresnel reflector. The secondary concentrator is a paraboloid reflector or Fresnel reflector. By adding the secondary concentrator, it achieves low light loss and high heat collection efficiency, and erosion of the heat collection tube by sand, rain, and snow can be effectively prevented, thereby extending the lifetime of the heat collection tube effectively.

9 Claims, 11 Drawing Sheets

(51) Int. Cl.
    *F24S 80/10*     (2018.01)
    *F24S 80/54*     (2018.01)
    *F24S 10/40*     (2018.01)
    *F24S 23/79*     (2018.01)
    *F24S 50/20*     (2018.01)
    *F24S 80/00*     (2018.01)
    *F24S 23/70*     (2018.01)

(52) U.S. Cl.
    CPC ............... F24S 50/20 (2018.05); F24S 80/10 (2018.05); F24S 80/54 (2018.05); *F24S 2020/23* (2018.05); *F24S 2023/872* (2018.05); *F24S 2080/015* (2018.05)

(58) Field of Classification Search
    USPC ................................ 126/684–687, 692, 672
    See application file for complete search history.

DOUBLE-LINE FOCUSING SOLAR ENERGY COLLECTION APPARATUS

CROSS-REFERENCES TO RELATED APPLICATIONS

This application is a 371 application of the International Patent Application No. PCT/CN2018/087465 filed on May 18, 2018, which claims priority from the Chinese patent application No. 201710352005.4 filed on May 18, 2017 and the Chinese patent application No. 201710352302.9 filed on May 18, 2017, and the disclosures of which are incorporated herein by reference in their entirety.

FIELD OF THE INVENTION

The present invention relates to the field of solar energy collection with high efficiency in photothermal conversion. More specifically, the present invention relates to a double line focusing solar energy collection apparatus.

BACKGROUND OF THE INVENTION

There are two types of solar energy conversion, direct absorption and indirect absorption. With direct absorption, solar radiation is directly absorbed by a heat-carrying medium in which the temperature of the medium increases to enable photothermal conversion. With indirect absorption, solar radiation is absorbed by a light-absorbing coating, and heat is transferred to a heat-carrying medium after the temperature of the coating increases, thereby increasing the temperature of the medium to enable photothermal conversion. There have been cases of use and study for both of these types. When comparing the technology of the indirect absorption, no heat absorption coating is used in solar photothermal conversion of the direct absorption, which is advantageous to the durability of a heat collector. At the same time, since the internal temperature of the heat-carrying medium is uniform, damage caused by stress to the structure is reduced, which can reduce cost of manufacturing and maintenance. The present invention adopts a technical solution with the direct absorption.

The heat collector is a device, which can control a light path of radiation parallel light by a reflection surface to increase heating power for an object and improve the temperature of the object. From the perspective on light path control and focusing, there are two types, focusing and non-focusing. In these types, heating power provided by a focusing heat collector is higher than that of a non-focusing heat collector, and thus the focusing heat collector can achieve higher heating temperatures. For the focusing heat collectors, there are two main categories, line focusing and point focusing. The line focusing is that focusing parallel light into line shape. The point focusing is that focusing parallel light into point shape.

There are two methods for absorption of radiation energy with a heated object in the heat collector by direct and indirect means. The direct method uses a medium to directly absorb the radiation energy and converts it to increase its own temperature. The indirect method uses a coating to absorb the radiation energy, and then heat is transferred to a heated medium after the temperature of the coating increases, thereby increasing the temperature of the medium.

A solution of improving the direct absorption technology mainly aims at improving an optical concentration ratio of an incident light path. The concentrators with different types have very different optical concentration ratios. A range in an optical concentration ratio of a rotating parabolic concentrating heat collector is very high, which is about 500 to 3000. A range in a concentration ratio of a parabolic cylindrical concentrating heat collector is about 20 to 80. A range in a concentration ratio of a linear Fresnel lens concentrating heat collector is about 6 to 30. A range in a concentration ratio of a circular Fresnel lens concentrating heat collector is relatively high, about 100 to 1000. A range in a concentration ratio of a linear Fresnel reflector concentrating heat collector is about 15 to 50. Therefore, when applying different concentrators or combinations of concentrators, collection efficiency of an apparatus to light is quite different. The present invention mainly aims at issues of collection and utilization of parts of light, thereby improving optical/photothermal efficiency of the apparatus.

SUMMARY OF THE INVENTION

The purpose of the present part is to outline some aspects of embodiments of the present invention and briefly introduce some preferred embodiments. Some simplification or omission may be made in the present part, the abstract, and the invention title name of the present application, so as to avoid blurring the purpose of the present part, the abstract, and the invention title name, and such simplification or omission cannot be used to limit the scope of the present invention.

In view of the problems of high unit cost and low heat collection efficiency in the existing medium temperature solar heat collector, the present invention provides a double line focusing solar energy collection apparatus with a secondary concentrator added therein, in which the secondary concentrator is a paraboloid reflector or Fresnel reflector. A heat collection tube is located between the secondary concentrator and a primary concentrator and located on focus lines of the secondary concentrator and the primary concentrator. The apparatus can reflect sunlight passing through the heat collection tube back to the primary concentrator again and then gather the same to a heat collector once again, thereby achieving low light loss and high heat collection efficiency. In this regard, a paraboloid reflector or Fresnel reflector can be applied to serve as the primary concentrator.

Therefore, the purpose of the present invention is to provide a double line focusing solar energy collection apparatus.

In order to solve the technical problems above, the present invention provides the following technical solutions. A double line focusing solar energy collection apparatus includes heat collector, a secondary concentrator, and a bracket. The heat collector includes a primary concentrator and a heat collection tube, in which the primary concentrator has a focus line. The secondary concentrator has a focus line. The bracket supports the primary concentrator, the heat collection tube, and the secondary concentrator. The heat collection tube is located between the primary concentrator and the secondary concentrator and is located on focus lines of the secondary concentrator and the primary concentrator. The primary concentrator is a paraboloid reflector or Fresnel reflector. The secondary concentrator is a paraboloid reflector or Fresnel reflector.

In a preferred technical solution of the double line focusing solar energy collection apparatus of the present invention, the heat collection tube is a straight tube and has a cross section in a circle, an ellipse, or a flat rectangle.

In a preferred technical solution of the double line focusing solar energy collection apparatus of the present invention, the heat collection tube is a vacuum tube including an outer tube and an inner tube. An interval between the outer tube and the inner tube is vacuum, and the inner tube carries an energy absorbing medium.

In a preferred technical solution of the double line focusing solar energy collection apparatus of the present invention, both the outer tube and the inner tube are transparent.

In a preferred technical solution of the double line focusing solar energy collection apparatus of the present invention, the outer tube is made of glass, polymethyl methacrylate (PMMA), or polycarbonate (PC).

In a preferred technical solution of the double line focusing solar energy collection apparatus of the present invention, the inner tube is made of glass, PMMA, or PC.

In a preferred technical solution of the double line focusing solar energy collection apparatus of the present invention, the apparatus further includes a solar energy tracking device.

The advantageous effects of the present invention are given as follows. In the present invention, a secondary concentrator is added, in which the secondary concentrator is a paraboloid reflector or Fresnel reflector. A heat collection tube is located between the secondary concentrator and a primary concentrator and located on focus lines of the secondary concentrator and the primary concentrator, in which the applied primary concentrator is a paraboloid reflector or Fresnel reflector having the focus line. The apparatus can direct sunlight passing through the heat collection tube to the primary concentrator by a second reflection provided by the secondary concentrator, and then the sunlight is gathered to the heat collection tube once again. The above process can be repeated many times until the illumination is fully absorbed, thereby achieving low light loss and high heat collection efficiency. By adding the secondary concentrator, erosion of the heat collection tube by sand, rain, and snow can be effectively prevented, thereby extending the lifetime of the heat collection tube effectively. The heat collection tube can be divided into an outer tube and an inner tube. The outer tube and the inner tube are transparent, which allows the light focused by the Fresnel reflector to be absorbed by the heat collection tube. The unabsorbed light then can pass through the heat collection tube and reach the secondary concentrator to convert it into parallel light, and then a secondary focusing to the parallel light occurs across the primary concentrator to enable the parallel light to be absorbed by the heat collection tube, thereby further improving the heat collection efficiency of the solar collection apparatus.

BRIEF DESCRIPTION OF THE DRAWINGS

In order to explain technical solutions of embodiments of the present invention more clearly, the following is a brief introduction to a figure which contains descriptions of the embodiments; what the figures below merely show are some embodiments of the present invention; and for a person skilled in the art, without working with non-obviousness, it is possible to further create other figures according to the figures below, in which.

DETAILED DESCRIPTION

The above described objectives, features and advantages of the present invention will become more apparent from the detailed descriptions.

Many specific details are described in the following descriptions to facilitate full understanding of the present invention, but the present invention can be implemented in other ways different from the descriptions herein. Those skilled in the art can make similar variation without violating the spirit of the present invention, so the present invention is not limited by the specific embodiments as disclosed below.

Secondly, the term "an embodiment" or "embodiments" herein refers to specific features, structures, or characteristic that may be included in at least one embodiment of the present invention. In the present disclosure, the term "in an embodiment" appearing in different places does not refer to the same embodiment nor individual or selective embodiment mutually exclusive with other embodiments.

In the present invention, since a focusing way of a concentrator in a double line focusing solar energy collection apparatus is applied by line focusing using a Fresnel mirror and a paraboloid mirror respectively, configurations of the Fresnel mirror and the paraboloid mirror respectively used for severing as a primary concentrator 11 and a secondary concentrator 3 are specifically elaborated in the different embodiments, so as to better explain embodiments and technical effects of the present apparatus.

Figure 1:
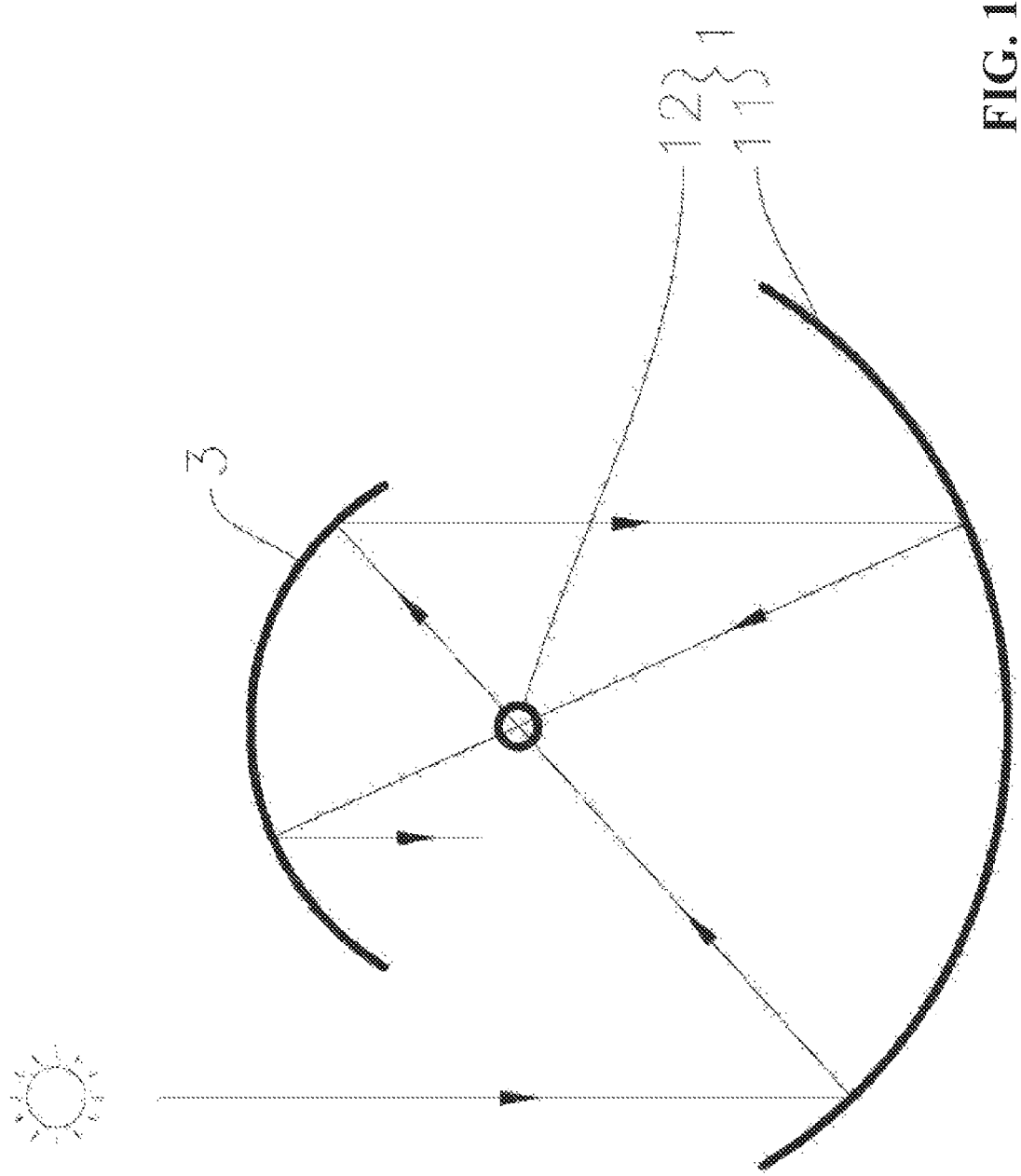
FIG. 1 is a schematic diagram of an optical path of using a paraboloid reflector to enhance a paraboloid reflector in a line focusing solar energy collection apparatus according to a first embodiment of the present invention.
Figure 2:
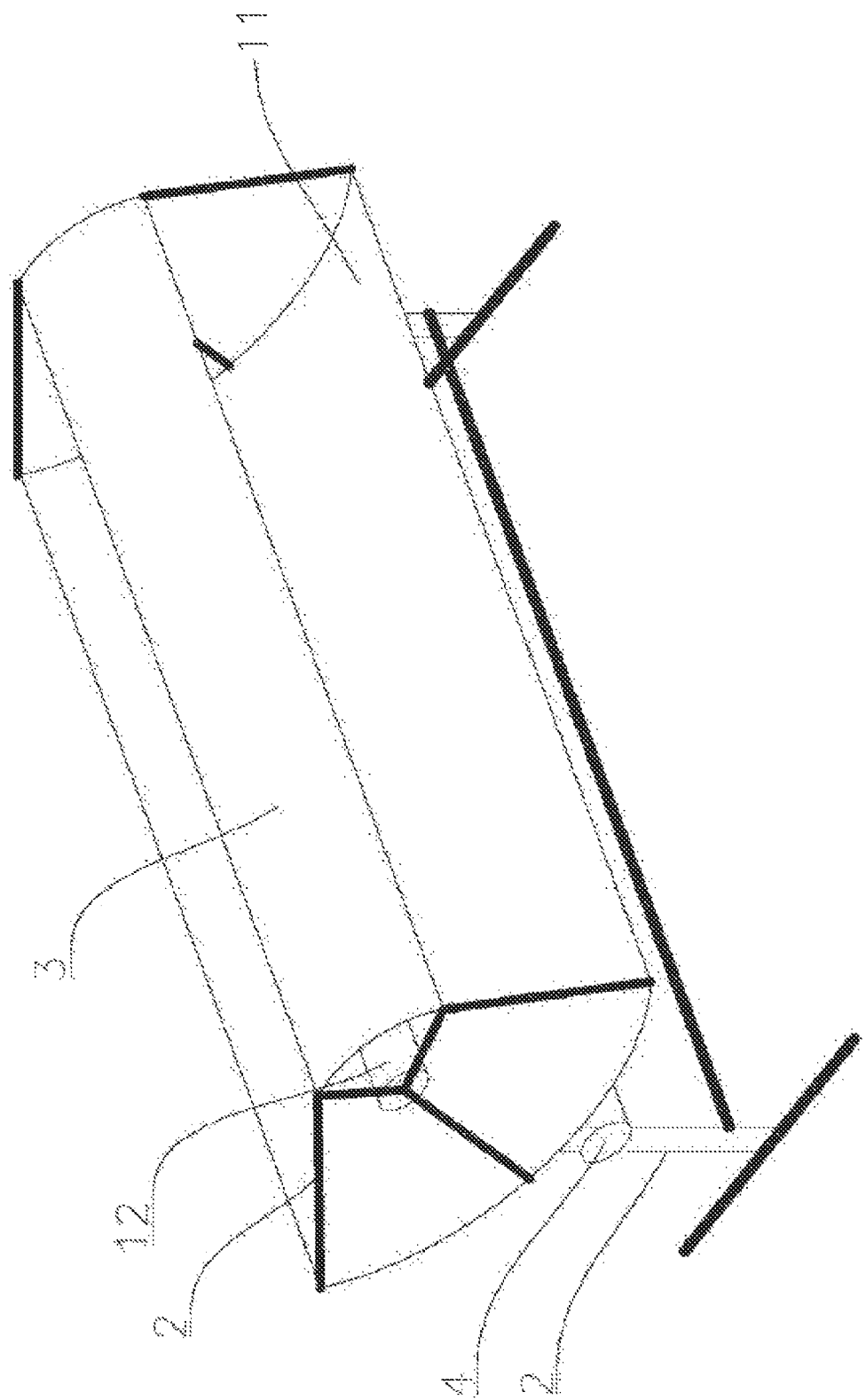
FIG. 2 is a schematic diagram of a structure of using a paraboloid reflector to enhance a paraboloid reflector in a line focusing solar energy collection apparatus according to a first embodiment of the present invention.

Referring to FIGS. 1 and 2, illustrating a double line focusing solar energy collection apparatus of a first embodiment of the present invention, in the present embodiment, the apparatus includes a configuration including a heat collector 1, a secondary concentrator 3, and a bracket 2, in which the heat collector 1 and the secondary concentrator 3 are supported by the bracket 2.

Specifically, the heat collector 1 includes a primary concentrator 11 and a heat collection tube 12. The primary concentrator 11 is a paraboloid reflector. A paraboloid reflector is used as the secondary concentrator 3, in which both the primary concentrator 11 and the secondary concentrator 3 have focus lines.

In the present embodiment, it should be noted that an opening of the primary concentrator 11 is greater than an opening of the secondary concentrator 3, thereby avoiding no light to be illuminated onto the primary concentrator 11. In a first-time incident light path, the primary concentrator 11 is downstream of the secondary concentrator 3. That is, the primary concentrator 11 is below the secondary concentrator 3. The "first-time incident light" mentioned above refers to the light that contacts with the primary concentrator 11 of the present apparatus at first under an illumination condition, which can be distinguished from light reflected by the primary concentrator 11 and the secondary concentrator 3. Because new incident light generates when the light is reflected, the "first-time incident light" path is introduced herein as the reference, so as to describe the locations of primary concentrator 11 and secondary concentrator 3 more clearly.

The heat collection tube 12 is disposed between the primary concentrator 11 and the secondary concentrator 3, and the heat collection tube 12 is located at the focus lines of the primary concentrator 11 and the secondary concentrator 3 simultaneously.

It should be noted that the heat collection tube 12 carries an energy absorbing medium. The primary concentrator 11, the heat collection tube 12, and the secondary concentrator 3 are all supported by the bracket 2.

It should be noted that the afore-mentioned "the carried energy absorbing medium" in the present embodiment can be water, glycol, heat conducting oil, or ionic liquid, but not limited to these several substances as listed.

In practical implementation, referring to FIG. 1 which illustrates a light path of the double line focusing solar energy collection apparatus of the present invention, parallel light illuminates on the paraboloid reflector of the primary concentrator 11 in the beginning. The light is focused by the paraboloid reflector of the primary concentrator 11 to gather to the heat collection tube 12. The light passing through the heat collection tube 12 then reaches the secondary concentrator 3, and the secondary concentrator 3 converts the received light into parallel light. Thereafter, the parallel light is incident on the paraboloid reflector of the primary concentrator 11 and then is focused again until the light is completely absorbed.

Preferably, in a case of the opening of the primary concentrator 11 is 400 mm and the opening of the paraboloid reflector of the secondary concentrator 3 is 100 mm, a focal length of the primary concentrator 11 is 800 mm and a focal length of the secondary concentrator 3 is 200 mm. In the present embodiment, the heat collection tube 12 is a double tube preferably. An inner tube has an inner diameter of 16 mm and an outer diameter of 20 mm. An outer tube has an inner diameter of 35 mm and an outer diameter of 40 mm. In order to better explain the technical content and the technical effect resulted from the technical solution, the explanation is given through the different efficiency of absorbing the light by the heat collection tube 12.

In a case of the heat collection tube 12 having an absorptivity of 0.8 to light that passes therethrough once, both the primary concentrator 11 and the secondary concentrator 3 have the reflectivities of 0.92 to the light. In a case that no secondary concentrator 3 is disposed and only the primary concentrator 11 is disposed, the efficiency of the apparatus is 73.6%. However, in the present embodiment, the secondary concentrator 3 is disposed, and the efficiency of the apparatus is 88.6%. Accordingly, by using the apparatus with the double focusing, the efficiency increases about 20% relative to that of the only single focusing.

It should be noted that the afore-described sizes of the openings of the primary concentrator 11 and the secondary concentrator 3, as well as the corresponding focal lengths of those two and the size of the heat collection tube 12 are not limited to the values in the embodiment, which means the embodiment is provided only for the exemplary purpose. However, it needs to meet the requirements that the opening of the primary concentrator 11 is greater than the opening of the secondary concentrator 3, and the focal length of the primary concentrator 11 is greater than the focal length of the secondary concentrator 3. Moreover, in the first-time incident light path, the primary concentrator 11 is downstream of the secondary concentrator 3, and the secondary concentrator 3 is upstream of the primary concentrator 11. That is, the primary concentrator 11 is below the secondary concentrator 3. The "first-time incident light" mentioned above refers to light that contacts with the primary concentrator 11 of the present apparatus at first time under the illumination condition, which can be distinguished from light reflected by the primary concentrator 11 and the secondary concentrator 3. Because new incident light generates when the light is reflected, the "first-time incident light" path is introduced herein as the reference, so as to describe the locations of primary concentrator 11 and secondary concentrator 3 more clearly.

Figure 3:
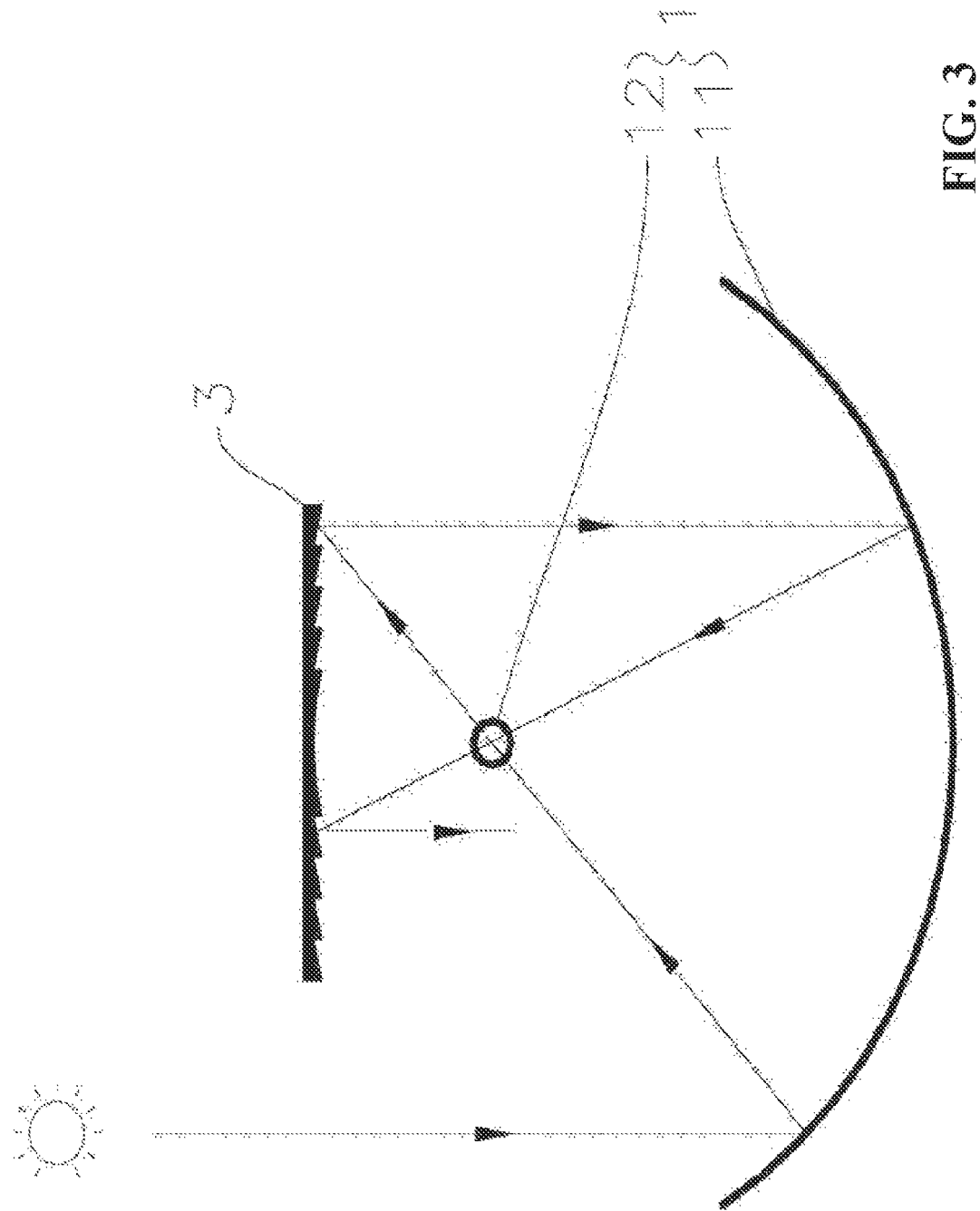
FIG. 3 is a schematic diagram of an optical path of using a Fresnel reflector to enhance a paraboloid reflector in a line focusing solar energy collection apparatus according to a second embodiment of the present invention.
Figure 4:
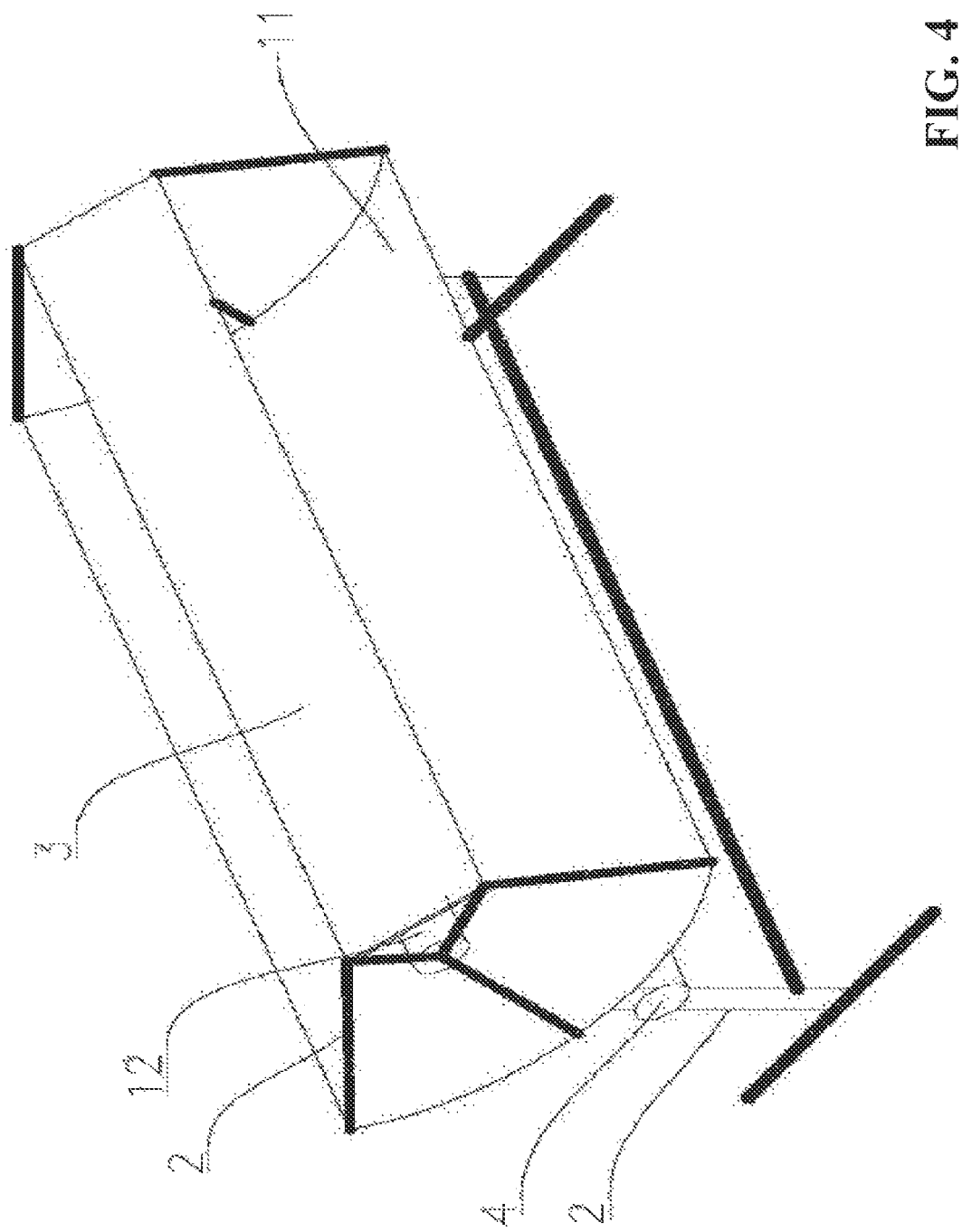
FIG. 4 is a schematic diagram of a structure of using a Fresnel reflector to enhance a paraboloid reflector in a line focusing solar energy collection apparatus according to a second embodiment of the present invention.

Referring to FIGS. 3 and 4, illustrating a double line focusing solar energy collection apparatus of a second embodiment of the present invention, a difference between the present embodiment and the first embodiment is that the primary concentrator 11 is a paraboloid reflector and the secondary concentrator 3 is a Fresnel reflector in the present embodiment, and both the primary concentrator 11 and the secondary concentrator 3 have focus lines.

Specifically, in the present embodiment, the apparatus includes a configuration including a heat collector 1, a secondary concentrator 3, and a bracket 2, in which the heat collector 1 and the secondary concentrator 3 are supported by the bracket 2.

The heat collector 1 includes a primary concentrator 11 and a heat collection tube 12. The primary concentrator 11 is a paraboloid reflector. A Fresnel reflector is used as the secondary concentrator 3, in which both the primary concentrator 11 and the secondary concentrator 3 have focus lines.

The heat collection tube 12 is disposed between the primary concentrator 11 and the secondary concentrator 3, and the heat collection tube 12 is located at the focus lines of the primary concentrator 11 and the secondary concentrator 3 simultaneously.

It should be noted that the heat collection tube 12 carries an energy absorbing medium. The primary concentrator 11, the heat collection tube 12, and the secondary concentrator 3 are all supported by the bracket 2.

In practical implementation, referring to FIG. 3 which illustrates a light path of the double line focusing solar energy collection apparatus of the present invention, parallel light illuminates on the paraboloid reflector of the primary concentrator 11 in the beginning. The light is focused by the paraboloid reflector of the primary concentrator 11 to gather to the heat collection tube 12. The light passing through the heat collection tube 12 then reaches the secondary concentrator 3, and the secondary concentrator 3 converts the received light into parallel light. Thereafter, the parallel light is incident on the paraboloid reflector of the primary concentrator 11 and then is focused again until the light is completely absorbed.

Preferably, the heat collection tube 12 is a straight tube, which may be ellipsoidal, spherical or square. That is, the heat collection tube 12 has a cross section in a circle, an ellipse, or a flat rectangle. The cross section of the heat collection tube 12 is spherical, and the collection tube 12 has a pipeline carrying an energy absorbing medium, which includes a feeding tube 123 and a discharging tube 124.

It should be noted that the pipeline used herein means: first, it can be configured to carry the energy absorbing medium; and second, it can be configured to support the heat collection tube 12 such that the heat collection tube 12 can be located on the focus lines of the primary concentrator 11 and the secondary concentrator 3.

Preferably, in a case of an opening of the primary concentrator 11 is 400 mm and an opening of the Fresnel reflector of the secondary concentrator 3 is 100 mm, a focal length of the primary concentrator 11 is 800 mm and a focal length of the secondary concentrator 3 is 200 mm. In the present embodiment, the heat collection tube 12 is a double tube preferably. An inner tube has an inner diameter of 16 mm and an outer diameter of 20 mm. An outer tube has an inner diameter of 35 mm and an outer diameter of 40 mm. In order to better explain the technical content and the technical effect resulted from the technical solution, the explanation is given through the different efficiency of absorbing the light by the heat collection tube 12.

In a case of the heat collection tube 12 having an absorptivity of 0.5 to light that passes therethrough once, both the primary concentrator 11 and the secondary concentrator 3 have reflectivities of 0.92 to the light. In a case that no secondary concentrator 3 is disposed and only the primary concentrator 11 is disposed, the efficiency of the apparatus is 46%. However, in the present embodiment, the secondary concentrator 3 is disposed, and the efficiency of the apparatus is 79.8%. Accordingly, by using the apparatus with the double focusing, the efficiency increases about 73% relative to that of the only single focusing.

It should be noted that the afore-described sizes of the openings of the primary concentrator 11 and the secondary concentrator 3, as well as the corresponding focal lengths of those two and the size of the heat collection tube 12 are not limited to the values in the embodiment, which means the embodiment is provided only for the exemplary purpose. However, it needs to meet the requirements that the opening of the primary concentrator 11 is greater than the opening of the secondary concentrator 3, and the focal length of the primary concentrator 11 is greater than the focal length of the secondary concentrator 3. Moreover, in the first-time incident light path, the primary concentrator 11 is downstream of the secondary concentrator 3, and the secondary concentrator 3 is upstream of the primary concentrator 11. That is, the primary concentrator 11 is below the secondary concentrator 3. The "first-time incident light" mentioned above refers to light that contacts with the primary concentrator 11 of the present apparatus at first time under the illumination condition, which can be distinguished from light reflected by the primary concentrator 11 and the secondary concentrator 3. Because new incident light generates when the light is reflected, the "first-time incident light" path is introduced herein as the reference, so as to describe the locations of primary concentrator 11 and secondary concentrator 3 more clearly.

Figure 5:
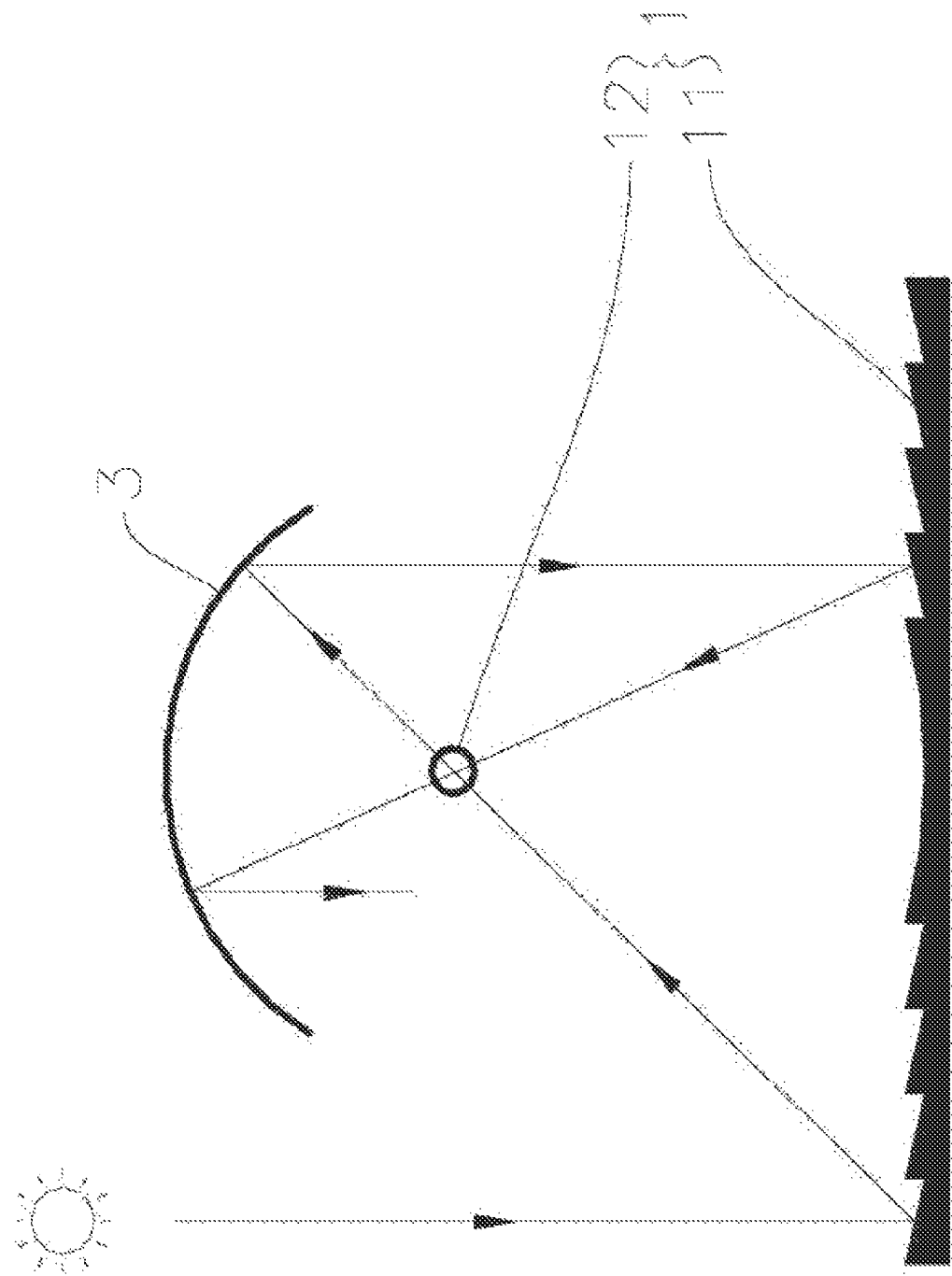
FIG. 5 is a schematic diagram of an optical path of using a paraboloid reflector to enhance a Fresnel reflector in a line focusing solar energy collection apparatus according to a third embodiment of the present invention.
Figure 6:
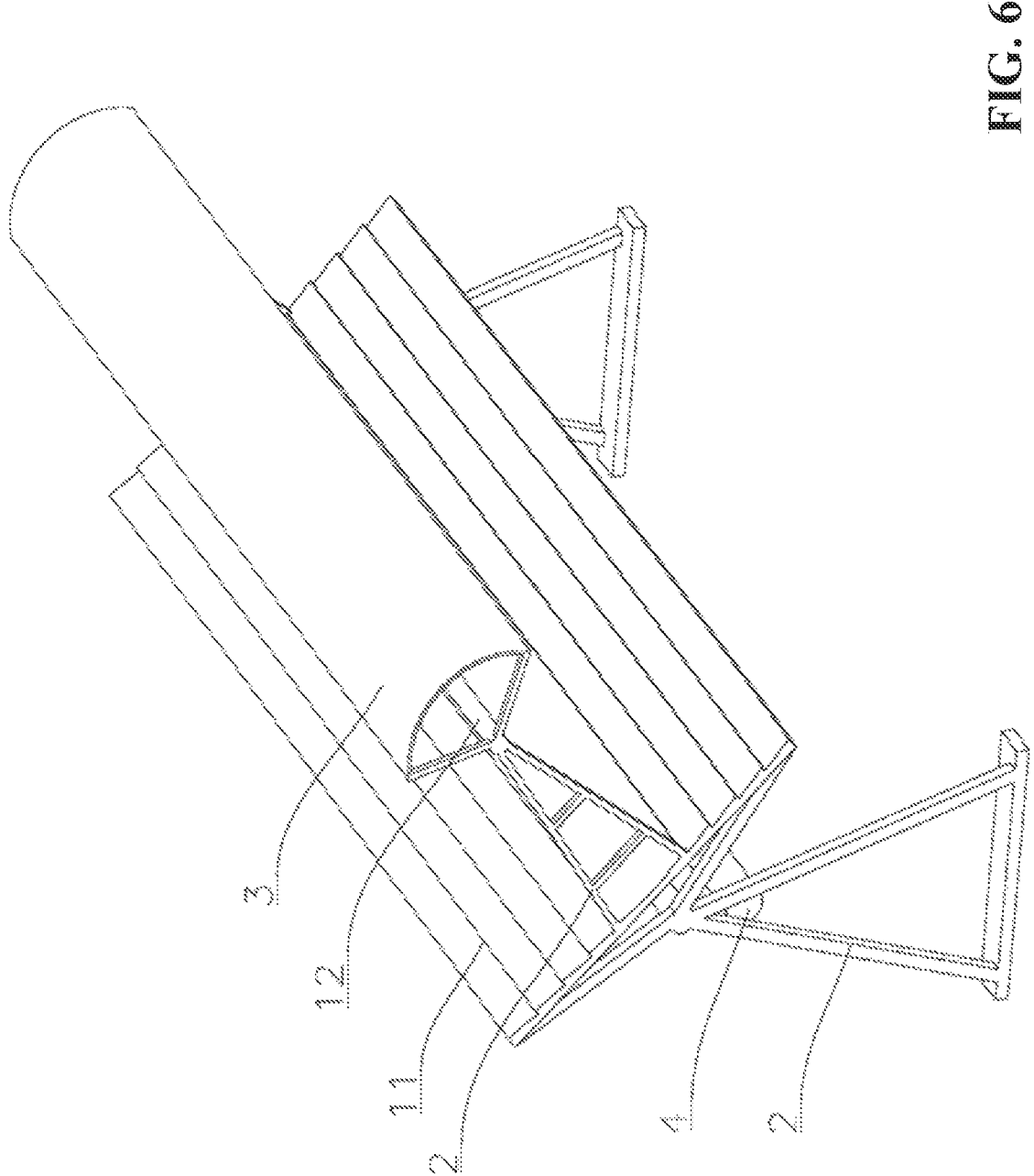
FIG. 6 is a schematic diagram of a structure of using a paraboloid reflector to enhance a Fresnel reflector in a line focusing solar energy collection apparatus according to a third embodiment of the present invention.

Referring to FIGS. 5 and 6, illustrating to a double line focusing solar energy collection apparatus of a third embodiment of the present invention, a difference between the present embodiment and the second embodiment is that the primary concentrator 11 is a Fresnel reflector and the secondary concentrator 3 is a paraboloid reflector in the present embodiment, and both the primary concentrator 11 and the secondary concentrator 3 have focus lines.

Specifically, the heat collector 1 includes a primary concentrator 11 and a heat collection tube 12. The primary concentrator 11 is a Fresnel reflector. A paraboloid reflector is used as the secondary concentrator 3, in which both the primary concentrator 11 and the secondary concentrator 3 have focus lines.

The heat collection tube 12 is disposed between the primary concentrator 11 and the secondary concentrator 3, and the heat collection tube 12 is located at the focus lines of the primary concentrator 11 and the secondary concentrator 3 simultaneously.

It should be noted that the heat collection tube 12 carries an energy absorbing medium. The primary concentrator 11, the heat collection tube 12, and the secondary concentrator 3 are all supported by the bracket 2.

In practical implementation, as shown in FIG. 5 which illustrates a light path of the double line focusing solar energy collection apparatus of the present invention, parallel light illuminates on the Fresnel reflector of the primary concentrator 11 in the beginning. The light is focused by the Fresnel reflector of the primary concentrator 11 to gather to the heat collection tube 12. The light passing through the heat collection tube 12 then reaches the secondary concentrator 3, and the secondary concentrator 3 converts the received light into parallel light. Thereafter, the parallel light is incident on the Fresnel reflector of the primary concentrator 11 and then is focused again until the light is completely absorbed.

Preferably, in a case of an opening of the primary concentrator 11 is 800 mm and an opening of the paraboloid reflector of the secondary concentrator 3 is 200 mm, the focal length of the primary concentrator 11 is 1600 mm and the focal length of the secondary concentrator 3 is 400 mm. In the present embodiment, the heat collection tube 12 is a double tube preferably. An inner tube has an inner diameter of 35 mm and an outer diameter of 30 mm. An outer tube has an inner diameter of 60 mm and an outer diameter of 50 mm. In order to better explain the technical content and the technical effect resulted from the technical solution, the explanation is given through the different efficiency of absorbing the light by the heat collection tube 12.

In a case of the heat collection tube 12 having an absorptivity of 0.35 to light that passes therethrough once, both the primary concentrator 11 and the secondary concentrator 3 have the reflectivities of 0.92 to the light. In a case that no secondary concentrator 3 is disposed and only the primary concentrator 11 is disposed, the efficiency of the apparatus is 32.3%. However, in the present embodiment, the secondary concentrator 3 is disposed, and the efficiency of the apparatus is 71.6%. Accordingly, by using the apparatus with the double focusing, the efficiency increases about 122% relative to that of the only single focusing.

It should be noted that the afore-described sizes of the openings of the primary concentrator 11 and the secondary concentrator 3, as well as the corresponding focal lengths of those two and the size of the heat collection tube 12 are not limited to the values in the embodiment, which means the embodiment is provided only for the exemplary purpose. However, it needs to meet the requirements that the opening of the primary concentrator 11 is greater than the opening of the secondary concentrator 3, and the focal length of the primary concentrator 11 is greater than the focal length of the secondary concentrator 3. Moreover, in the first-time incident light path, the primary concentrator 11 is downstream of the secondary concentrator 3, and the secondary concentrator 3 is upstream of the primary concentrator 11. That is, the primary concentrator 11 is below the secondary concentrator 3. The "first-time incident light" mentioned above refers to light that contacts with the primary concentrator 11 of the present apparatus at first time under the illumination condition, which can be distinguished from light reflected by the primary concentrator 11 and the secondary concentrator 3. Because new incident light generates when the light is reflected, the "first-time incident light" path is introduced herein as the reference, so as to describe the locations of primary concentrator 11 and secondary concentrator 3 more clearly.

Figure 7:
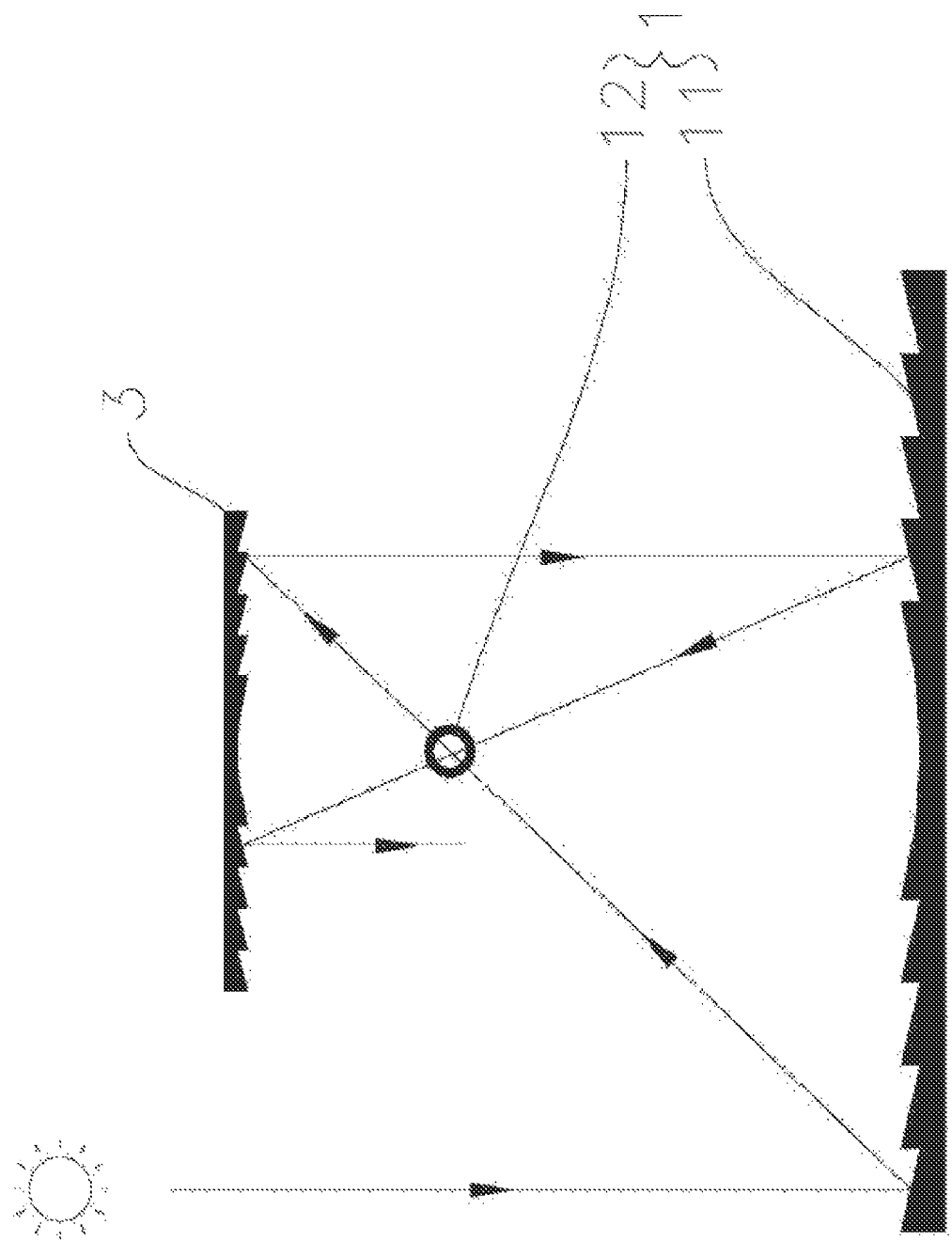
FIG. 7 is a schematic diagram of an optical path of using a Fresnel reflector to enhance a Fresnel reflector in a line focusing solar energy collection apparatus enhancement according to a fourth embodiment of the present invention.
Figure 8:
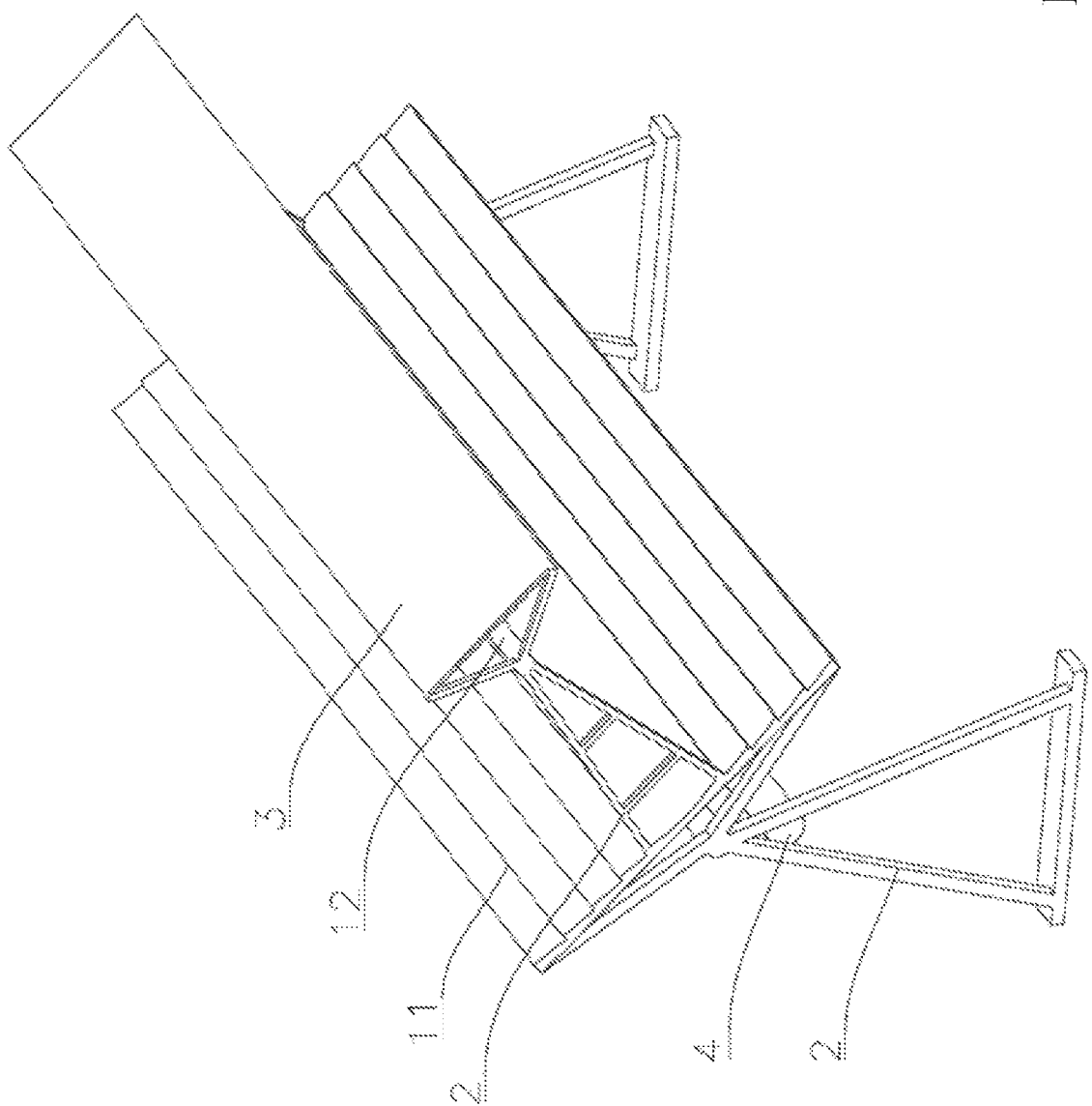
FIG. 8 is a schematic diagram of a structure of using a Fresnel reflector to enhance a Fresnel reflector in a line focusing solar energy collection apparatus enhancement according to a fourth embodiment of the present invention.

Referring to FIGS. 7 and 8, illustrating a double line focusing solar energy collection apparatus of a fourth embodiment of the present invention, a difference between the present embodiment and the third embodiment is that the primary concentrator 11 is a Fresnel reflector and the secondary concentrator 3 is a Fresnel reflector in the present embodiment, and both the primary concentrator 11 and the secondary concentrator 3 have focus lines.

Specifically, the heat collector 1 includes a primary concentrator 11 and a heat collection tube 12. The primary concentrator 11 is a Fresnel reflector and the secondary concentrator 3 is a Fresnel reflector, in which both the primary concentrator 11 and the secondary concentrator 3 have focus lines.

The heat collection tube 12 is disposed between the primary concentrator 11 and the secondary concentrator 3, and the heat collection tube 12 is located at the focus lines of the primary concentrator 11 and the secondary concentrator 3 simultaneously.

It should be noted that the heat collection tube 12 carries an energy absorbing medium. The primary concentrator 11, the heat collection tube 12, and the secondary concentrator 3 are all supported by the bracket 2.

In practical implementation, as shown in FIG. 7 which illustrates a light path of the double line focusing solar energy collection apparatus of the present invention, parallel light illuminates on the Fresnel reflector of the primary concentrator 11 in the beginning. The light is focused by the Fresnel reflector of the primary concentrator 11 to gather to the heat collection tube 12. The light passing through the heat collection tube 12 then reaches the secondary concentrator 3, and the secondary concentrator 3 converts the received light into parallel light. Thereafter, the parallel light is incident on the Fresnel reflector of the primary concentrator 11 and then is focused again until the light is completely absorbed.

Preferably, in a case of an opening of the primary concentrator 11 is 800 mm and an opening of the Fresnel reflector of the secondary concentrator 3 is 200 mm, the focal length of the primary concentrator 11 is 1600 mm and the focal length of the secondary concentrator 3 is 400 mm. In the present embodiment, the heat collection tube 12 is a double tube preferably. An inner tube has an inner diameter of 35 mm and an outer diameter of 30 mm. An outer tube has an inner diameter of 60 mm and an outer diameter of 50 mm. In order to better explain the technical content and the technical effect resulted from the technical solution, the explanation is given through the different efficiency of absorbing the light by the heat collection tube 12.

In a case of the heat collection tube 12 having an absorptivity of 0.6 to light that passes therethrough once, both the primary concentrator 11 and the secondary concentrator 3 have the reflectivities of 0.85 to the light. In a case that no secondary concentrator 3 is disposed and only the primary concentrator 11 is disposed, the efficiency of the apparatus is 51%. However, in the present embodiment, the secondary concentrator 3 is disposed, and the efficiency of the apparatus is 71.1%. Accordingly, by using the apparatus with the double focusing, the efficiency increases about 41% relative to that of the only single focusing.

It should be noted that the afore-described sizes of the openings of the primary concentrator 11 and the secondary concentrator 3, as well as the corresponding focal lengths of those two, and the size of the heat collection tube 12 are not limited to the values in the embodiment, which means the embodiment is provided only for the exemplary purpose. However, it needs to meet the requirements that the opening of the primary concentrator 11 is greater than the opening of the secondary concentrator 3, and the focal length of the primary concentrator 11 is greater than the focal length of the secondary concentrator 3. Moreover, in the first-time incident light path, the primary concentrator 11 is downstream of the secondary concentrator 3, and the secondary concentrator 3 is upstream of the primary concentrator 11. That is, the primary concentrator 11 is below the secondary concentrator 3. The "first-time incident light" mentioned above refers to light that contacts with the primary concentrator 11 of the present apparatus at first time under the illumination condition, which can be distinguished from light reflected by the primary concentrator 11 and the secondary concentrator 3. Because new incident light generates when the light is reflected, the "first-time incident light" path is introduced herein as the reference, so as to describe the locations of primary concentrator 11 and secondary concentrator 3 more clearly.

For a double line focusing solar energy collection apparatus in accordance with a fifth embodiment of the present invention, a difference between the fifth embodiment and the fourth embodiment is that the apparatus further includes a solar energy tracking device 4. The solar energy tracking device 4 is mainly configured to track sun light, such that the solar energy collection apparatus is always in an optimal photothermal conversion state. The solar energy tracking device 4 can be realized by any existing solar energy tracking device, as long as it can track the sunlight.

Figure 9:
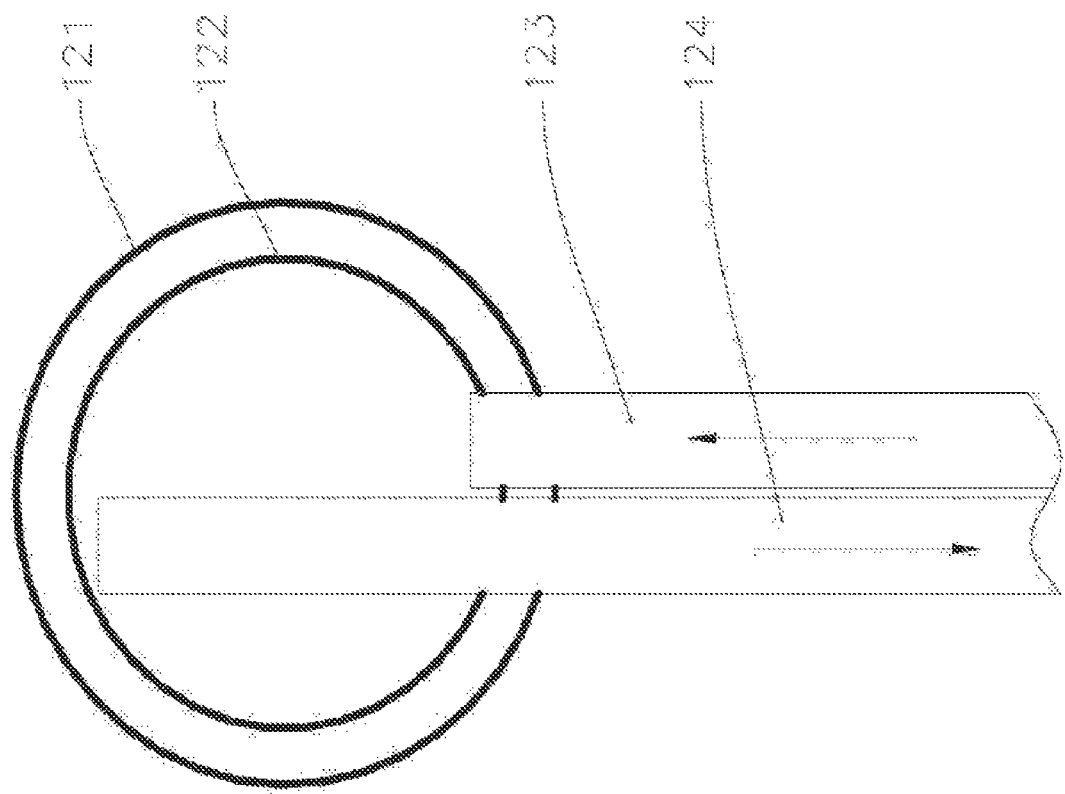
FIG. 9 is a schematic diagram of a partial structure of a heat collection tube of a double line focusing solar energy collection apparatus according to a sixth embodiment of the present invention.

Referring to FIG. 9 which refers to a double line focusing solar energy collection apparatus of a sixth embodiment of the present invention, a difference between the present embodiment and the fifth embodiment is that the heat collection tube 12 is a vacuum tube, which includes an outer tube 121 and an inner tube 122. An interval between the outer tube 121 and the inner tube 122 is vacuum, and the inner tube 122 carries an energy absorbing medium.

In the heat collection tube 12, a feeding pipe 123 and a discharging pipe 124 pass through the outer pipe 121 and the inner pipe 122 in sequence, respectively, and reach the inside of the inner pipe 122.

Preferably, an included angle between the feeding pipe 123 and the discharging pipe 124 is in a range from 0° to 180°. In the present embodiment, the included angle is preferably 0°. In practical applications, according to the practical operation, the included angle between the feeding pipe 123 and the discharging pipe 124 can be selected from 30°, 45°, 60°, 90°, 120°, 135°, or 150°.

Preferably, both the outer tube 121 and the inner tube 122 are transparent.

Preferably, the outer tube 121 is made of glass, polymethyl methacrylate (PMMA), or polycarbonate (PC).

Preferably, the inner tube 122 is made of glass, PMMA, or PC.

The following are analyses of the reflection effect of the double line focusing solar energy collection apparatus.

In the solar energy heat collector 1 of the direct absorption type, it is assumed that a heat medium in a heat collection tube has an absorptivity α to solar radiation, that a reflection surface has a reflectivity β to solar radiation, and that the heat collector 1 has a comprehensive absorptivity η to solar radiation. With the technical solution of the present invention, the data are provided as follows.

TABLE 1

| an absorptivity of a heat medium α | a reflectivity of a reflection surface β | a comprehensive absorptivity of a heat collector (without any secondary reflection surface) η | a comprehensive absorptivity of a heat collector (with a secondary reflection surface) η' | an enhancement ratio of a secondary reflection surface r |
|---|---|---|---|---|
| 0.1 | 0.92 | 0.09 | 0.39 | 4.20 |
| 0.2 |  | 0.18 | 0.57 | 3.10 |
| 0.3 |  | 0.28 | 0.68 | 2.45 |
| 0.4 |  | 0.37 | 0.75 | 2.03 |
| 0.5 |  | 0.46 | 0.80 | 1.73 |
| 0.6 |  | 0.55 | 0.83 | 1.51 |
| 0.7 |  | 0.64 | 0.86 | 1.34 |
| 0.8 |  | 0.74 | 0.89 | 1.20 |
| 0.9 |  | 0.83 | 0.90 | 1.09 |

TABLE 2

| an absorptivity of a heat medium α | a reflectivity of a reflection surface β | a comprehensive absorptivity of a heat collector (without any secondary reflection surface) η | a comprehensive absorptivity of a heat collector (with a secondary reflection surface) η' | an enhancement ratio of a secondary reflection surface r |
|---|---|---|---|---|
| 0.1 | 0.85 | 0.09 | 0.24 | 2.86 |
| 0.2 |  | 0.17 | 0.40 | 2.37 |
| 0.3 |  | 0.26 | 0.52 | 2.02 |
| 0.4 |  | 0.34 | 0.60 | 1.77 |
| 0.5 |  | 0.43 | 0.67 | 1.57 |
| 0.6 |  | 0.51 | 0.72 | 1.41 |
| 0.7 |  | 0.60 | 0.76 | 1.28 |
| 0.8 |  | 0.68 | 0.79 | 1.17 |
| 0.9 |  | 0.77 | 0.82 | 1.08 |

TABLE 3

| an absorptivity of a heat medium α | a reflectivity of a reflection surface β | a comprehensive absorptivity of a heat collector (without any secondary reflection surface) η | a comprehensive absorptivity of a heat collector (with a secondary reflection surface) η' | an enhancement ratio of a secondary reflection surface r |
|---|---|---|---|---|
| 0.1 | 0.8 | 0.08 | 0.19 | 2.36 |
| 0.2 |  | 0.16 | 0.33 | 2.05 |
| 0.3 |  | 0.24 | 0.43 | 1.81 |
| 0.4 |  | 0.32 | 0.52 | 1.62 |
| 0.5 |  | 0.40 | 0.59 | 1.47 |
| 0.6 |  | 0.48 | 0.65 | 1.34 |
| 0.7 |  | 0.56 | 0.69 | 1.24 |
| 0.8 |  | 0.64 | 0.73 | 1.15 |
| 0.9 |  | 0.72 | 0.77 | 1.07 |

Figure 10:
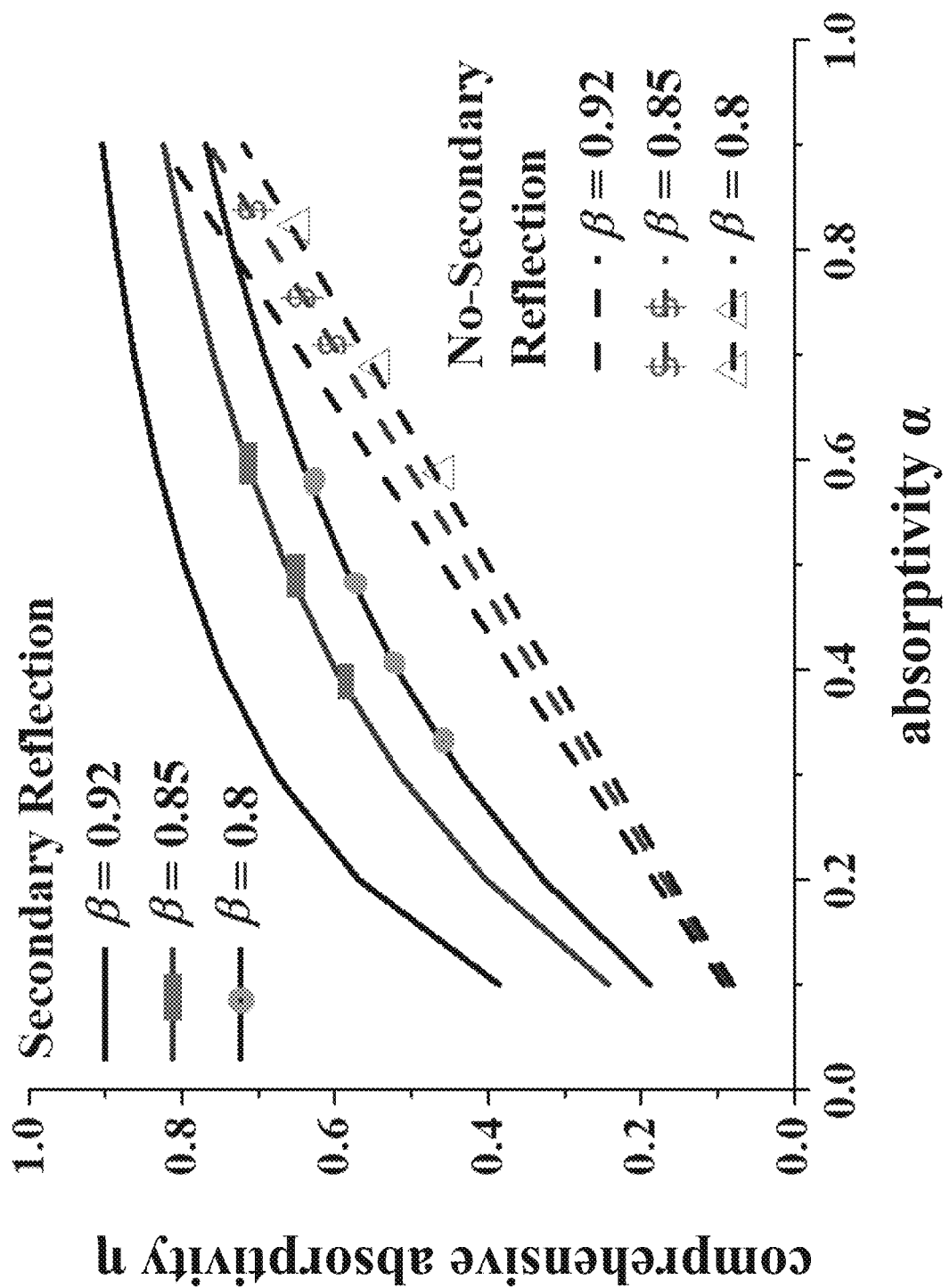
FIG. 10 is a schematic diagram of a comprehensive absorptivity of the present invention to sunlight radiation.

Referring to FIG. 10, what is shown in FIG. 10 reflects that the comprehensive absorptivity of the heat collector 1 to the solar radiation can be improved by adopting the design of the secondary reflection surface.

Figure 11:
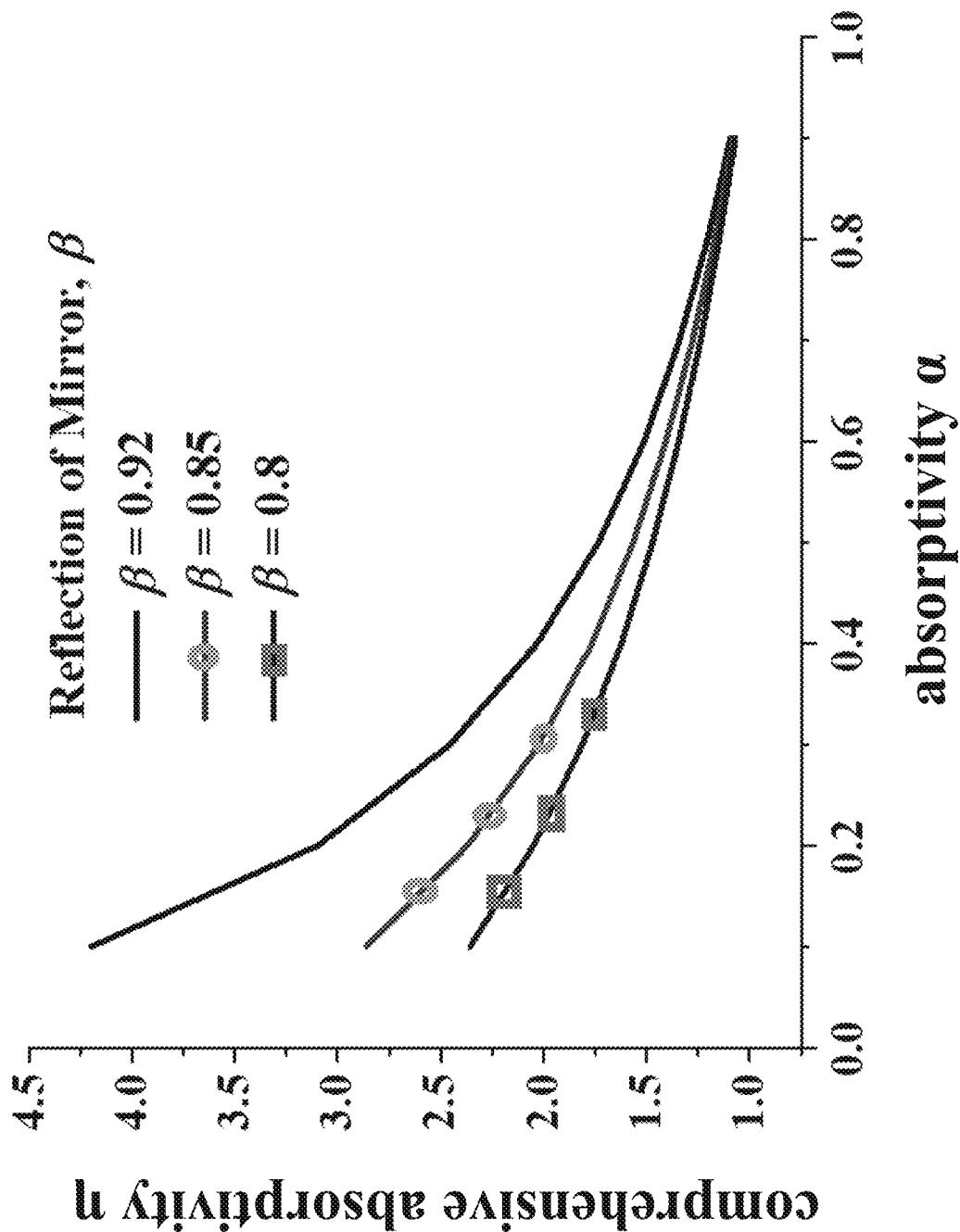
FIG. 11 is a schematic diagram of an enhancement effect of the present invention to sunlight radiation absorption.

As shown in FIG. 11, by adopting the design of the secondary reflection surface, the comprehensive absorptivity of the heat collector 1 of the direct absorption to the solar radiation can be improved, which especially occurs under the condition of when the reflection surface has a higher reflectivity and the heat medium has a lower single absorptivity to the solar radiation. In cases of the reflection surface having the reflectivity of 0.92 and the respective heat mediums having the single absorptivities of 0.3 and 0.5, the enhancement ratios of the respective secondary reflection surfaces to the comprehensive absorptivity of the heat collector 1 can achieve 2.45 and 1.3, which means effective improvement to the photothermal conversion of the apparatus to the solar radiation is achieved.

It should be noted that the above embodiments are only used to explain the technical solution of the present invention, not the limitation. Although the present invention is described in details with reference to the preferred embodiments, it should be understood by those skilled in the art that the technical solution of the present invention can be modified or replaced equally without departing from the spirit and scope of the technical solution of the present invention, which should be covered in the right of the present invention.

What is claimed is:

1. A double line focusing solar energy collection apparatus, comprising:
    a heat collector comprising a primary concentrator and a heat collection tube, wherein the primary concentrator has a focus line;
    a secondary concentrator having a focus line;
    wherein a first opening of the primary concentrator is greater than a second opening of the secondary concentrator, and a first focal length of the primary concentrator is greater than a second focal length of the secondary concentrator, wherein a first ratio of the first opening to the first focal length is equal to a second ratio of the second opening to the second focal length; and
    a bracket supporting the primary concentrator, the heat collection tube, and the secondary concentrator, wherein the heat collection tube is located between the primary concentrator and the secondary concentrator and is located on focus lines of the secondary concentrator and the primary concentrator, wherein the primary concentrator is a Fresnel reflector, and the secondary concentrator is a Fresnel reflector, wherein the heat collection tube is a vacuum tube comprising an outer tube and an inner tube, an interval between the outer tube and the inner tube is vacuum, and the inner tube carries an energy absorbing medium, and wherein the outer tube is transparent, and the inner tube which is innermost in the heat collection tube is transparent.

2. The double line focusing solar energy collection apparatus of claim 1, wherein the heat collection tube is a straight tube and has a cross section in a circle, an ellipse, or a flat rectangle.

3. The double line focusing solar energy collection apparatus of claim 2, further comprising a solar energy tracking device.

4. The double line focusing solar energy collection apparatus of claim 1, further comprising a solar energy tracking device.

5. The double line focusing solar energy collection apparatus of claim 1, wherein the outer tube is made of glass, polymethyl methacrylate (PMMA), or polycarbonate (PC).

6. The double line focusing solar energy collection apparatus of claim 1, wherein the inner tube is made of glass, polymethyl methacrylate (PMMA), or polycarbonate (PC).

7. The double line focusing solar energy collection apparatus of claim 1, wherein the first opening of the primary concentrator is 800 mm and the second opening of the secondary concentrator is 200 mm, the first focal length of the primary concentrator is 1600 mm and the second focal length of the secondary concentrator is 400 mm.

8. The double line focusing solar energy collection apparatus of claim 1, wherein the inner tube has an inner diameter of 35 mm and an outer diameter of 30 mm, and the outer tube has an inner diameter of 60 mm and an outer diameter of 50 mm.

9. The double line focusing solar energy collection apparatus of claim 1, wherein the transparent outer tube and the transparent inner tube of the heat collection tube allows a light beam propagated from the primary concentrator to pass therethrough and to travel to the secondary concentrator.

* * * * *